(12) United States Patent
Hansson

(10) Patent No.: US 7,101,128 B2
(45) Date of Patent: Sep. 5, 2006

(54) CUTTING TOOL AND CUTTING HEAD THERETO

(75) Inventor: Per Hansson, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/512,349

(22) PCT Filed: Apr. 8, 2003

(86) PCT No.: PCT/SE03/00568

§ 371 (c)(1),
(2), (4) Date: Feb. 23, 2005

(87) PCT Pub. No.: WO03/090959

PCT Pub. Date: Nov. 6, 2003

(65) Prior Publication Data

US 2005/0117987 A1    Jun. 2, 2005

(30) Foreign Application Priority Data

Apr. 25, 2002  (SE) ................................... 0201235

(51) Int. Cl.
   *B23C 5/26* (2006.01)
   *B23Q 11/00* (2006.01)

(52) U.S. Cl. ...................... 409/234; 409/232; 409/233; 408/239 R; 408/239 A; 407/40

(58) Field of Classification Search ................ 409/234, 409/232, 233, 141; 407/33, 34, 40, 46, 47, 407/48, 49, 50, 51, 53, 54, 66, 73, 102, 101; 408/239 A, 239 R, 143, 238, 240
See application file for complete search history.

(56) References Cited

U.S. PATENT DOCUMENTS

| | | | | |
|---|---|---|---|---|
| 4,575,293 A | * | 3/1986 | Berti | 409/234 |
| 4,655,655 A | * | 4/1987 | Schurfeld | 409/232 |
| 4,934,883 A | * | 6/1990 | Andersson et al. | 409/234 |
| 4,971,491 A | * | 11/1990 | Cook | 409/234 |
| 4,979,851 A | * | 12/1990 | Hunt | 408/239 R |
| 5,259,709 A | * | 11/1993 | Hunt | 409/234 |

(Continued)

FOREIGN PATENT DOCUMENTS

EP    0 294 348    12/1988

(Continued)

*Primary Examiner*—Monica Carter
*Assistant Examiner*—Dana Ross
(74) *Attorney, Agent, or Firm*—Drinker Biddle & Reath LLP

(57) ABSTRACT

A tool such as a milling or drilling tool includes a shaft having a front recess in which a cutting head is disposed. A drawbar disposed in the shaft includes a plurality of flexible tongues disposed in the recess. The tongues form a recess in which a rear knob of the cutting head is received. A retainer urges the drawbar axially rearwardly to retain the cutting head in the recess. The shaft includes axial projections at its front end which are received in respective rearwardly open recesses of the cutting head to prevent relative rotation between the shaft and the cutting head.

11 Claims, 4 Drawing Sheets

U.S. PATENT DOCUMENTS

| | | | |
|---|---|---|---|
| 5,716,173 A * | 2/1998 | Matsumoto | 408/239 A |
| 5,885,039 A * | 3/1999 | Boisvert | 409/232 |
| 5,997,226 A * | 12/1999 | Tagami | 409/231 |
| 6,109,152 A * | 8/2000 | Hecht | 409/234 |
| 6,540,449 B1 * | 4/2003 | Bejerstål et al. | 407/40 |
| 6,599,068 B1 * | 7/2003 | Miyazawa | 409/234 |
| 6,779,955 B1 * | 8/2004 | Rivin | 409/234 |
| 2001/0009636 A1 | 7/2001 | Men | |
| 2003/0025282 A1 * | 2/2003 | Rivin | 409/234 |

FOREIGN PATENT DOCUMENTS

| | | |
|---|---|---|
| EP | 0 298 937 | 1/1989 |
| EP | 0 776 719 | 6/1997 |
| EP | 0 949 030 | 10/1999 |
| JP | 620203703 | 9/1987 |
| WO | WO 01/030524 | 5/2001 |
| WO | WO 02/05996 | 1/2002 |

* cited by examiner

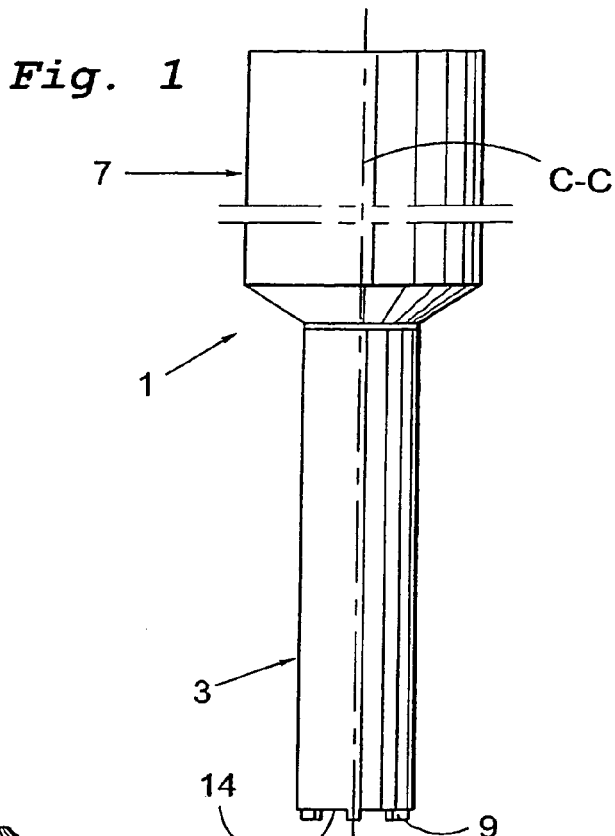
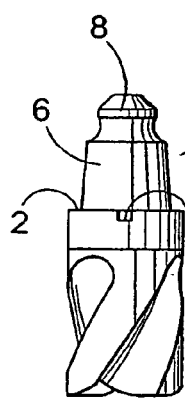
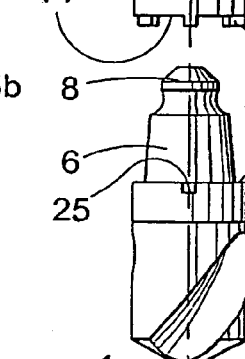
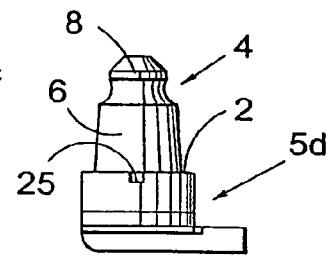
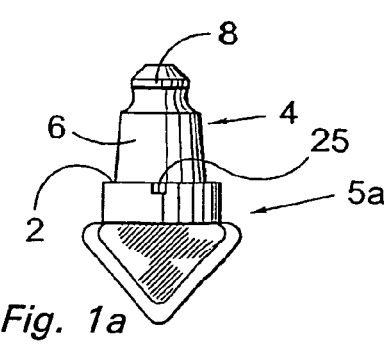

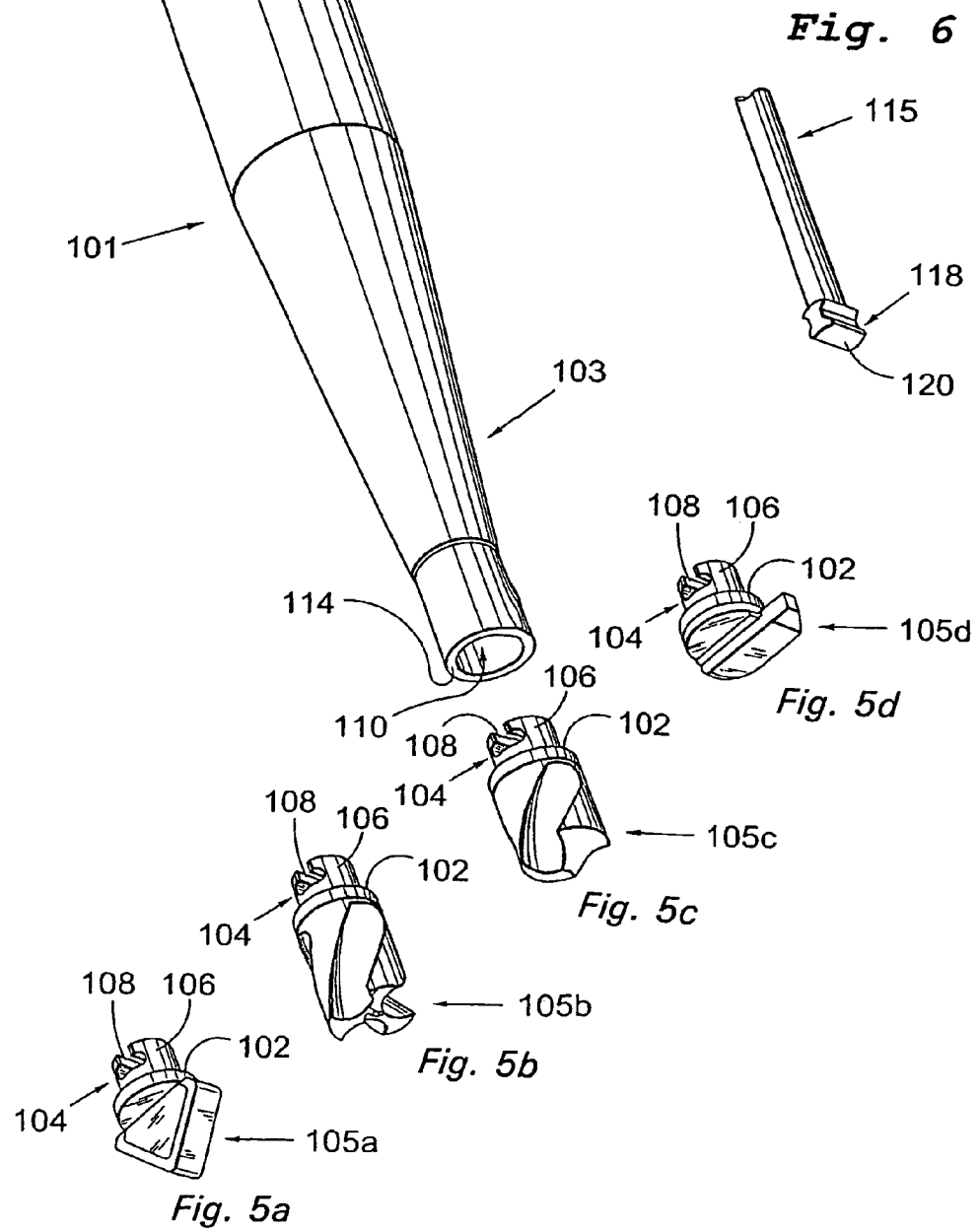

CUTTING TOOL AND CUTTING HEAD THERETO

TECHNICAL FIELD OF THE INVENTION

The present invention relates to a tool, especially for chip removing machining, whereby the tool, for instance, consists of a milling cutter or a drill. The tool comprises a tool shaft having a seat arranged in the shaft of the tool (which seat is located adjacent to one end of the shaft of the tool), a cutting head intended to be mounted in the seat, a drawbar (whereby the cutting head and the drawbar have members for interconnection), as well as members for applying a force to the drawbar in the axial direction of the tool shaft. The invention also separately relates to a cutting head that constitutes a replaceable part of the tool according to the present invention.

PRIOR ART

A tool unit is previously known from WO 02/05996, which comprises a cutting head, a tool shaft, as well as an elongated drawbar, which is axially displaceable in a hole of the shaft of the tool. The cutting head is connected to the drawbar via a thread coupling and the drawbar may be fixed in relation to the shaft of the tool, in the axial direction of the drawbar and the shaft of the tool. According to one embodiment, said fixation may be effected by a thread coupling, and according to another embodiment, the fixation may be effected by the fact that a locking screw received in the shaft of the tool interacts with a recess of the drawbar. It can not be understood from WO 02/05996 that there is any indexing between the cutting head and the shaft of the tool, which seems obvious since the presence of the thread couplings in principle makes indexing impossible.

A tool having a replaceable cutting head is previously known from EP 0 776 719 AI. In that connection, the cutting head is connected to a drawbar via a type of dovetail coupling. The drawbar is provided with an external thread that interacts with an internal thread of the shaft of the tool. On mounting of the cutting head, the same is rotated together with the drawbar, whereby the thread coupling provides an anchorage of the cutting head in the shaft of the tool. However, no indexing takes place in the direction of rotation of the cutting head, which is an obvious disadvantage.

OBJECTS AND FEATURES OF THE INVENTION

A primary object of the present invention is to provide a rotary tool of the type defined in the introduction, which has a good stability in spite of the fact that the cutting head is dismountable.

Yet an object of the present invention is that the rotary tool should have acceptable tolerances in respect of the chip removing machining that is carried out by the rotary tool according to the present invention.

Another object of the present invention is that an indexing between the cutting head and the shaft of the tool in the direction of rotation of the tool should be possible.

At least the primary object is realized by means of a tool which comprises a tool shaft, a drawbar, a cutting head, and a retainer. The tool shaft defines a longitudinal axis and includes a seat disposed at a front end thereof. The seat comprises a recess. The drawbar is disposed in the tool shaft and includes a front end disposed in the recess. The front end comprises a plurality of flexible tongues forming therebetween a forwardly open space. The cutting head includes a rear knob contained in the space. The retainer is arranged to apply an axial rearward force to the drawbar. The tool shaft and the cutting head include interengaging surfaces which prevent relative rotation between the tool shaft and the cutting head about the axis.

BRIEF DESCRIPTION OF THE DRAWINGS

Below, embodiments of the invention will be described, reference being made to the appended drawings, where:

FIG. 1 shows an exploded view of a first embodiment of a tool shaft and a number of cutting heads that are included in a tool according to the present invention;

FIGS. 1a–1d show side views of four different types of cutting heads, respectively, that can be mounted in the shaft of FIG. 1;

FIG. 5 shows a perspective view of an alternative embodiment of a tool shaft;

FIGS. 5a through 5d show perspective views of four different types of cutting heads, respectively, that can be mounted in the tool shaft of FIG. 5;

FIG. 6 shows a perspective view of a drawbar, which is intended to be mounted in the shaft of the tool according to FIG. 5;

FIG. 7 shows a side view of a cutting head shown in FIG. 5a; and

DETAILED DESCRIPTION OF PREFERRED EMBODIMENTS OF THE INVENTION

Figure 2:
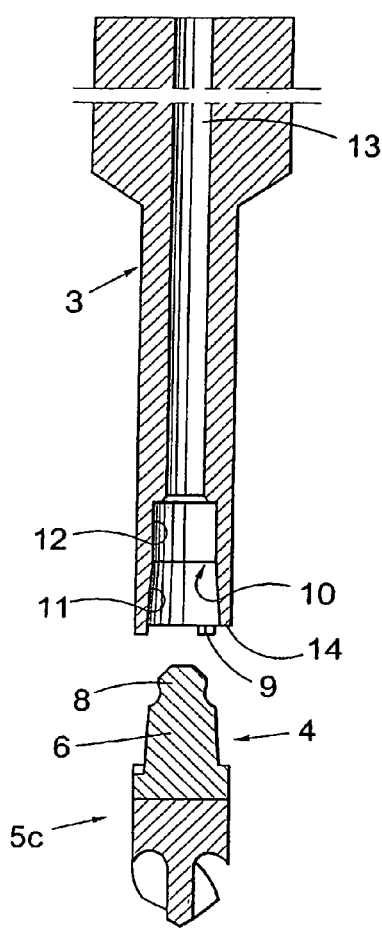
FIG. 2 shows an exploded longitudinal cross-section through the shaft of the tool according to FIG. 1 and a cutting head.

The shaft of the tool 1, illustrated in FIGS. 1 and 2, comprises a holder part 3 for receipt of a cutting head 5a–5d as well as a clamping part 7, which is intended to be clamped in a machine tool. In FIG. 1, a longitudinal centre axis C—C is drawn in, thus extending in the axial direction of the tool shaft 1.

In the shaft of the tool 1 according to FIGS. 1 and 2, the holder part 3 is externally circular cylindrical and at the free end thereof, the holder part 3 has a number of rigid projections or shoulders 9, which have an extension both in the axial direction C—C of the tool shaft and in the direction of the circumference of the holder part 3. Between the rigid shoulders 9, the holder part 3 has a stop face 14. As is seen in FIG. 2, the shaft of the tool 1 is, at the free end of the holder part 3, provided with a recess forming an internal seat 10, which in the illustrated embodiment is divided into a conical female part 11, situated closest to the free end of the holder part 3, as well as a circular cylindrical female part 12, situated inside the conical female part 11. An internal, through hole 13 extends in the axial direction of the shaft of the tool 1 from the seat 10 to the free end of the clamping part 7.

Figure 3:
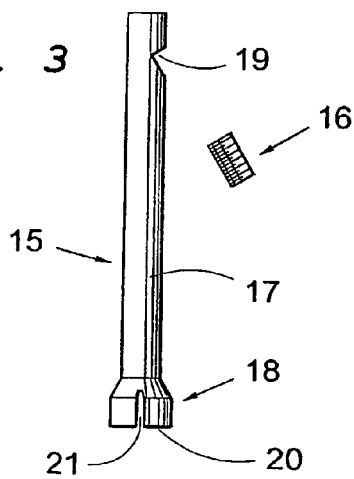
FIG. 3 shows a side view of a drawbar and an interacting screw, which are intended to be received in the shaft of the tool according to FIG. 1.

In FIG. 3, a side view is shown of a drawbar 15 and a screw retainer 16 interacting with the drawbar 15. The drawbar 15 comprises a preferably solid shaft part 17 as well as an engagement part 18, whereby the shaft part 17 and the engagement part 18 preferably are made integrally. The shaft part 17 is preferably of a circular cylindrical shape and is intended to be received in the through-hole 13, see FIG. 4. The shaft part 17 is provided with a notch 19, which is intended to interact with the screw 16.

The engagement part 18 in the illustrated embodiment comprises a number of flexible tongues 20, whereby said tongues 20 have been formed by a number of slots 21 extending in the axial direction. As is seen in FIG. 4, the tongues 20 define an internal space that widens in the direction from the open end of the space.

In FIGS. 1a–1d, a number of different cutting heads 5a–5d are shown, which are intended to be mounted in the holder part 3 of the shaft of the tool 1. All cutting heads 5a–5d have members for chip removing machining, i.e. edges that are integrated in the cutting head 5a–5d. Said members for chip removing machining may be formed in a plurality of different ways, and therefore they are not described in detail herein.

The cutting heads 5a–5d also have an anchorage part 4, that in principle has identical design in all the illustrated cutting heads 5a–5d. Thus, the anchorage part 4 comprises a conical male part 6 as well as a knob 8, integrated with the male part 6. In an intermediate step 2, each cutting head 5a–5d has a number of recesses 25, the open ends of which are facing the anchorage part 4. The recesses 25 are arranged along the circumference of the cutting head 5a–5d, and at such a distance between each other that each one of the recesses 25 is intended to receive one of the rigid shoulders 9 of the holder part 3.

Figure 4:
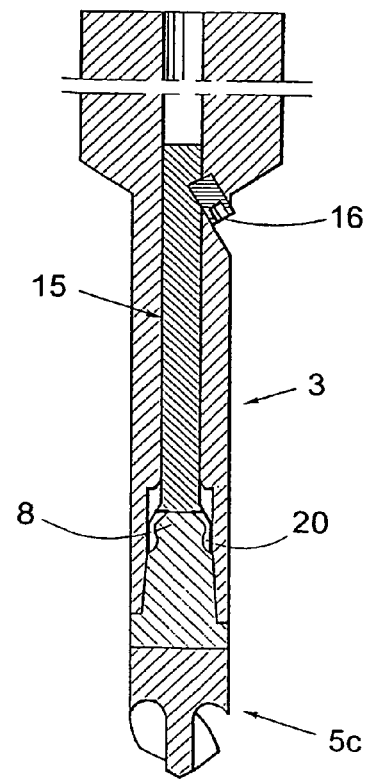
FIG. 4 shows a longitudinal cross-section through a cutting head as well as connecting parts of the shaft of the tool according to FIG. 1 and the drawbar according to FIG. 3.

In FIG. 4, it is shown how a cutting head 5c is mounted in the holder part 3. In that connection, the knob 8 is caused to be received in the internal space that is defined by the tongues 20. This is carried out thanks to the fact that the cutting head 5c and the drawbar 15 are mutually displaced in the axial direction towards each other. The flexible tongues 20 will thereby spring out so that the knob 8 may enter the internal space between the tongues 20, whereby the tongues 20 spring back as soon as the knob 8 has passed the free ends of the tongues 20. In FIG. 4, a position is shown where the knob 8 has assumed the final position thereof in the space defined by the tongues 20. When the cutting head 5c is connected to the drawbar 15 in a satisfactory way, the shaft part 17 of the drawbar 15 is caused to be received in the through-hole 13. On continued axial displacement of the drawbar 15, with the adhering cutting head 5c, the conical male part 6 of the cutting head 5c will be received in the conical female part 11 of the seat 10, and the engagement part 18, with the tongues 20, will be received in the circular cylindrical female part 12. During the final stage of the mounting of the cutting head 5c in the holder part 3, the rigid shoulders 9 of the holder part 3 will be received in the recesses 25 of the cutting head 5c, whereby the cutting head 5c is rotationally secured in relation to the holder part 3. In order to anchor the cutting head 5c in the seat 10 in a satisfactory way, an axial force is applied to the drawbar 15 in the direction away from the cutting head 5c. In the embodiment of a tool according to the present invention illustrated in FIGS. 1–5, this is carried out by the screw 16 being brought to interact with the notch 19 of the shaft part 17 of the drawbar 15. In that connection, the shaft of the tool 1 is provided with a threaded hole in the transition between the holder part 3 and the clamping part 7, see FIG. 4, into which the screw 16 is threaded in, whereby the free end of the screw 16 is received in the notch 19 of the shaft part 17. On continued rotation of the screw 16, the same will displace the drawbar 15 in the direction away from the free end of the holder part 3. Due to the fact that the engagement part 18 is received in the circular cylindrical female part 12, the tongues 20 cannot be displaced radially outwards, which means that the ball 8 of the cutting head 5c will be safely anchored in the engagement part 18. The displacement of the drawbar 15 is suitably effected for such a distance that the step 2 of the cutting head 5c comes into abutment against the stop face 14 of the holder part 3. The tool according to the present invention is thereby ready for use. In that context, it should be pointed out that the interaction that takes place between the rigid shoulders 9 and the recesses 25 unambiguously determines the position of the cutting edge/cutting edges in the direction of rotation of the tool, which is exceptionally important, for instance in internal turning.

The alternative embodiment of a tool according to the present invention illustrated in FIGS. 5 and 6 differs from the embodiment described above by the joint between the drawbar 115 and the cutting head 105a–105d. In FIGS. 5a–5d, a number of different cutting heads 105a–105d are shown, which are intended to be mounted in the holder part 103 of the shaft of the tool 101, which comprises a clamping part 107 in a way that corresponds with the above-described shaft of the tool 1. The holder part 103 has a seat 110, as well as a stop face 114, at the free end thereof.

Figure 7:
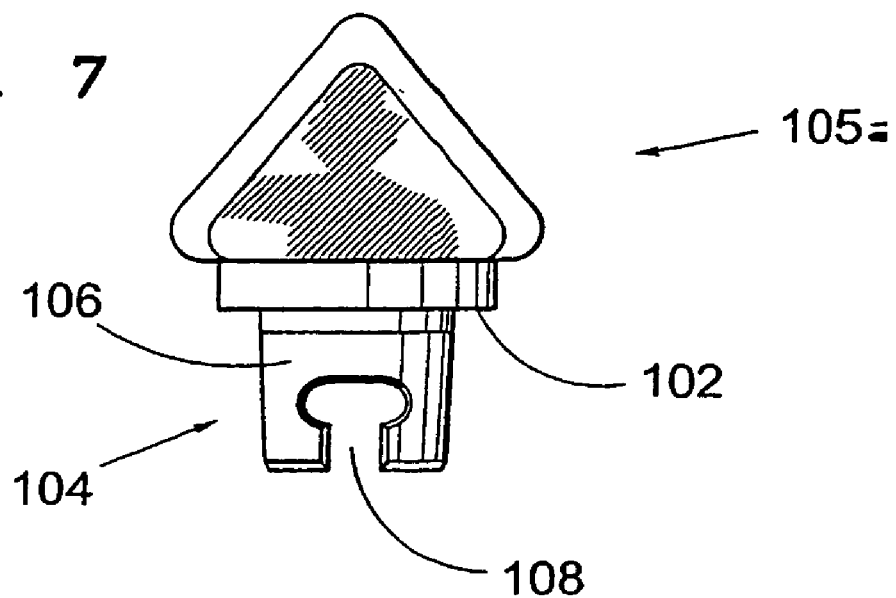

As is seen in FIGS. 5 and 6, the joint between the drawbar 115 and the cutting head 105a–105d is carried out by means of a type of dovetail coupling. Thereby, the drawbar 115 has an engagement part 118 having a generally T-shaped portion 120. The cutting head 105a–105d has a male part 106 having a generally T-shaped groove 108, see FIG. 7, extending transverse to the axial direction of the tool. In an intermediate portion, the cutting head 105a–105d has a step 102.

Figure 8:
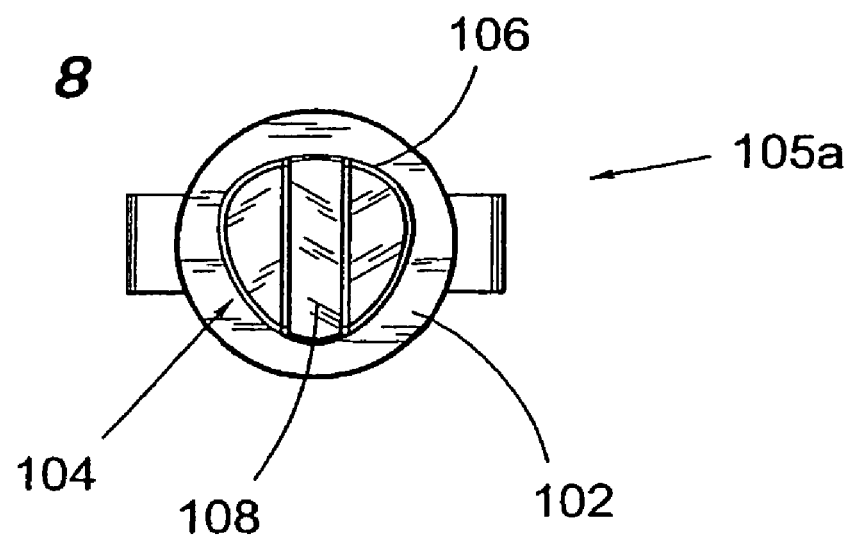
FIG. 8 shows a view from below of the cutting head according to FIG. 7.

In order to prevent mutual rotation of the cutting head 105a–105d in relation to the holder part 103, the male part 106 has an out of round shape in cross-section, see FIG. 8. Preferably, the male part 106 has a shape that equals the male part in the tool coupling that is marketed under the trademark COROMANT CAPTO®. Correspondingly, the seat 110 is preferably formed as the female part in the above-mentioned tool coupling.

When the cutting head 105a–105d is to be mounted in the holder part 103, the T-shaped portion 120 of the engagement part 118 is inserted into the T-shaped groove 108 of the male part 106. Then, the drawbar 115 is inserted into the shaft of the tool 101 and the male part 106 is received in the seat 110, whereby the shape of the male part 106 and the seat 110 prevents mutual rotation between the male part 106 and the seat 110. The male part 106 and the seat 110 are preferably slightly conical, which means that the male part 106 will be clamped around the engagement part 118 when the male part 106 is received in the seat 110, whereby a safe connection between the drawbar 115 and the cutting head 105a–105d is provided. In order to provide final mounting of the cutting head 105a–105d in the holder part 103, the drawbar is displaced in the axial direction of the tool in a way that corresponds with the above-described. In that connection, the step 102 contacts the contact surface 114, whereby the tool is ready for use.

Feasible Modifications of the Invention

In the embodiments described above, two examples of joints between the cutting head 5a–5d; 105a–105d and the drawbar 15; 115 are disclosed. However, a plurality of additional variants may be conceived within the scope of the present invention as for the joint in question, whereby a thread coupling may be mentioned for an exemplifying, and not limiting, purpose.

In the embodiment described above, relating to FIGS. 1–4, an axial displacement of the drawbar 15 is provided by the fact that a screw 16 interacts with a notch 19 of the drawbar 15. However, other design solutions that provide an axial displacement of the drawbar 15 may be conceived within the scope of the invention, whereby different types of thread couplings may be mentioned for an exemplifying, and not limiting, purpose.

In the above-described cutting heads 5a–5d; 105a–105d, the chip forming part is manufactured from solid cemented carbide. However, within the scope of the invention, it may be conceived that the cutting heads are equipped with indexable inserts that are fixed on the cutting heads in a conventional way.

The invention claimed is:

1. A tool comprising:
   a tool shaft defining a longitudinal axis and including a seat disposed at a front end thereof;
   a drawbar disposed in the tool shaft and including a front end disposed in the seat, the front end comprising a plurality of flexible tongues forming therebetween a forwardly open space;
   a cutting head including a rear knob contained in the space; and
   a retainer arranged to apply an axial rearward force to the drawbar;
   wherein the tool shaft and the cutting head include interengaging surfaces preventing relative rotation between the tool shaft and the cutting head about the axis.

2. The tool according to claim 1 wherein the seat comprises a recess having a conically shaped portion in which a conically shaped portion of the cutting head is received.

3. The tool according to claim 2 wherein the conically shaped portion of the recess forms a free end of the recess, the recess further including a cylindrical portion disposed rearwardly of the conically shaped portion, wherein the front end of the drawbar is disposed in the cylindrical portion.

4. The tool according to claim 1 wherein the cutting head includes a portion of reduced cross section forming a rearwardly facing stop face abutting the tool shaft.

5. The tool according to claim 4 wherein the interengaging surfaces are formed by axial projections on one of the tool shaft and the cutting head, and recesses formed in the other of the tool shaft and the cutting head and in which the axial projection is received.

6. The tool according to claim 5 wherein the projections are rigid and disposed on the tool shaft.

7. The tool according to claim 1 wherein the interengaging surfaces are formed by axial projections on one of the tool shaft and the cutting head, and recesses formed in the other of the tool shaft and the cutting head and in which the axial projection is received.

8. The tool according to claim 7 wherein the projections are rigid and disposed on the tool shaft.

9. The tool according to claim 8 wherein the recess comprises a conically shaped portion in which a conically shaped portion of the cutting head is received.

10. The tool according to claim 1 wherein the cutting head comprises a chip removing milling head.

11. The tool according to claim 1 wherein the cutting head comprises a chip removing drill head.

* * * * *